United States Patent
Lin et al.

(10) Patent No.: US 11,043,892 B2
(45) Date of Patent: Jun. 22, 2021

(54) TOTEM-POLE BRIDGELESS POWER FACTOR CORRECTOR AND POWER FACTOR CORRECTION METHOD

(71) Applicant: National Taiwan University of Science and Technology, Taipei (TW)

(72) Inventors: Jing-Yuan Lin, New Taipei (TW);
Ruei-Sheng Tsai, New Taipei (TW);
Zhong-Heng Li, Taichung (TW);
Pin-Hsien Liu, Changhua County (TW); Huang-Jen Chiu, New Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 16/896,326

(22) Filed: Jun. 9, 2020

(65) Prior Publication Data
US 2021/0126526 A1    Apr. 29, 2021

(30) Foreign Application Priority Data
Oct. 25, 2019  (TW) .................................. 108138603

(51) Int. Cl.
*H02M 1/42* (2007.01)
*H02M 7/217* (2006.01)
*H02M 7/5395* (2006.01)
*H02M 1/088* (2006.01)

(52) U.S. Cl.
CPC ......... *H02M 1/4233* (2013.01); *H02M 1/088* (2013.01); *H02M 1/4225* (2013.01); *H02M 7/5395* (2013.01); *H02M 2001/4283* (2013.01)

(58) Field of Classification Search
CPC .... H02M 1/42; H02M 1/4208; H02M 1/4225; H02M 1/4233; H02M 1/088; H02M 7/04; H02M 7/12; H02M 7/02; H02M 7/21; H02M 7/217; H02M 7/219; H02M 7/23; H02M 2001/0012; H02M 2001/4283
See application file for complete search history.

(56) References Cited

U.S. PATENT DOCUMENTS

| | | | |
|---|---|---|---|
| 7,535,205 B2* | 5/2009 | Popescu | H02M 7/217 323/222 |
| 10,193,437 B1 | 1/2019 | Hari et al. | |
| 10,461,628 B1* | 10/2019 | Wang | H02M 1/4225 |

(Continued)

FOREIGN PATENT DOCUMENTS

| | | |
|---|---|---|
| CN | 102721848 A | 10/2012 |
| CN | 107196499 A | 9/2017 |

(Continued)

*Primary Examiner* — Gary L Laxton
(74) *Attorney, Agent, or Firm* — Li & Cai Intellectual Property (USA) Office

(57) ABSTRACT

A totem-pole bridgeless power factor corrector and a power factor correction method are provided. The totem-pole bridgeless power factor corrector obtains a duty cycle of next state by a predictive valley-peak current control method, and uses an OR gate element to combine PWM signals generated by an average current control method and the predictive valley-peak current control method, thereby enabling a digital signal processor to update the duty cycle.

12 Claims, 6 Drawing Sheets

(56) References Cited

U.S. PATENT DOCUMENTS

| | | | | |
|---|---|---|---|---|
| 2006/0132104 A1* | 6/2006 | Li | ............................ | G05F 1/70 |
| | | | | 323/207 |
| 2009/0256543 A1* | 10/2009 | Yang | .................. | H02M 1/4208 |
| | | | | 323/284 |
| 2017/0033706 A1* | 2/2017 | Usami | ................. | H02M 1/4225 |
| 2018/0062504 A1* | 3/2018 | Mei | ........................... | G05F 1/70 |
| 2020/0099288 A1* | 3/2020 | Young | ................. | H02M 1/4208 |

FOREIGN PATENT DOCUMENTS

| | | | |
|---|---|---|---|
| CN | 110365205 A | | 10/2019 |
| TW | 201445861 A | | 12/2014 |

\* cited by examiner

TOTEM-POLE BRIDGELESS POWER FACTOR CORRECTOR AND POWER FACTOR CORRECTION METHOD

CROSS-REFERENCE TO RELATED PATENT APPLICATION

This application claims the benefit of priority to Taiwan Patent Application No. 108138603, filed on Oct. 25, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power factor corrector and a power factor correction method, and more particularly to a totem-pole bridgeless power factor corrector and a power factor correction method.

BACKGROUND OF THE DISCLOSURE

Although existing current totem pole bridgeless power factor correctors omit a bridge rectifier to reduce the overall size, a circuit switching frequency is still limited by the slow processing speed of a digital signal processor, and is unable to be increased to thus reduce a volume of magnetic components.

In existing power factor correctors, the digital signal processor has its limitations in calculation of the duty cycle. In detail, under high-frequency conditions, the digital signal processor may trigger an interruption before a correct duty cycle is calculated, causing the program to restart the calculation, such that the duty cycle is unable to be updated and causing serious current distortion in the circuit.

Therefore, how a control method can be improved to enable the digital signal processor to update the duty cycle without triggering an interruption has become an important issue in the art.

SUMMARY OF THE DISCLOSURE

In response to the above-referenced technical inadequacies, the present disclosure provides a totem pole bridgeless power factor corrector.

In one aspect, the present provides a totem-pole bridgeless power factor corrector connected to an input inductor that receives power from an AC power source having a first connection end connected to the input inductor and a second connection end, the totem pole bridgeless power factor corrector includes a first bridge, a second bridge, a capacitor, a load, and a digital signal processor. The first bridge is connected between a first node and a second node and includes a first switch and a second switch connected in series with the first switch, and the first bridge is connected to the input inductor through a connection point through which the first switch is connected in series with the second switch. The second bridge is connected between the first node and the second node, connected in parallel to the first bridge and includes a third switch and a fourth switch connected in series with the third switch, and the second bridge is connected to the second connection end through a connection point through which the third switch is connected in series with the fourth switch. The load is connected between the first node and the second node, and connected in parallel with the first bridge and the second bridge, the load is connected between the first node and the second node, and connected in parallel with the first bridge, the second bridge and the capacitor. The digital signal processor includes an average current control module, a predictive valley-peak current control module, a pulse width modulator module, a first OR gate and a second OR gate. The average current control module is configured to detect an input voltage of the AC power source and an output voltage of the first node, sample an inductor current of the input inductor to obtain a current duty cycle in a current state within a first switching cycle and a valley-peak current relative to a reference current, and execute an average current control algorithm to calculate an average current controlled next state duty cycle to generate an average current control signal. The predictive valley-peak current control module is connected to the average current control module and configured to obtain the input voltage, the output voltage, and the current duty cycle, and execute a predictive valley-peak current control algorithm within the first switching cycle to calculate a predictive valley-peak current controlled next state duty cycle to generate a predictive valley-peak current control signal. The pulse width modulator module receives the average current control signal and the predictive valley-peak current control signal, and is configured to generate a first average current controlled PWM signal, a first predictive valley-peak current controlled PWM signal, a second average current controlled PWM control signals and a second predictive valley-peak current controlled PWM signal. The first OR gate is configured to receive the first average current controlled PWM signal and the first predictive valley-peak current controlled PWM signal, and perform an OR operation to generate a first switch control signal for controlling the first switch within a second switching cycle. The second OR gate is configured to receive the second average current controlled PWM signal and the second predictive valley-peak current controlled PWM signal, and perform an OR operation to generate a second switch control signal for controlling the second switch within the second switching cycle. The pulse width modulator module is further configured to generate a third switch control signal and a fourth switch control signal based on the average current control signal and the predictive valley-peak current control signal for controlling the third switch and the fourth switch within the second switching cycle, respectively, and switching cycles of the first switch control signal and the second switch control signal are smaller than or equal to 0.5 times the first switching cycle.

In some embodiments, switching frequencies of the third switch control signal and the fourth switch control signal are equal to a voltage frequency of the AC power source.

In some embodiments, the first switch and the second switch are gallium nitride high-speed electron mobility field effect transistors, and the third switch and the fourth switch are metal oxide semiconductor field effect transistors.

In some embodiments, the first through the fourth switches alternatively operate in a positive half cycle mode and a negative half cycle mode with a voltage frequency of the AC power source.

In some embodiments, the digital signal processor further includes a soft-start control module that is connected to the pulse width modulator module, and that is configured to, in response to the first through the fourth switches entering the positive half-cycle mode from the negative half-cycle mode or entering the negative half-cycle mode from the positive half-cycle mode, gradually increase a duty cycle of the second switch or the first switch to reach a duty cycle indicated by the second switch signal or the first switch signal.

In some embodiments, the average current control module further includes a voltage loop compensator, an adder, a duty cycle feedforward control circuit, and a current loop compensator. The voltage loop compensator is configured to generate the reference current according to a difference between the output voltage and a reference voltage. The adder is configured to receive the reference current and the inductor current to generate a difference signal for indicating a difference between the reference current and the inductor current. The duty cycle feedforward control circuit includes a continuous conduction mode (CCM) calculation unit and a discontinuous conduction mode (DCM) calculation unit respectively configured to calculate a continuous conduction mode (CCM) duty cycle feedforward amount and a discontinuous conduction mode duty cycle feedforward amount according to the input voltage, the output voltage, and an ideal input parameter, and the duty cycle feedforward control circuit is configured to use the smallest one of the CCM duty cycle feedforward amount and the DCM duty cycle feedforward amount as a duty cycle feedforward amount and correspondingly output a duty cycle feedforward signal. The current loop compensator is configured to receive the difference signal and the duty cycle feedforward signal to execute the predictive valley-peak current control algorithm to calculate the valley-peak current predictive controlled next state duty cycle to generate the predictive valley-peak current control signal.

In another aspect, the present provides a power factor correction method applicable to a totem-pole bridgeless power factor corrector connected to an input inductor that receives power from an AC power source having a first connection end connected to the input inductor and a second connection end, and the power factor correction method includes: configuring an average current control module to detect an input voltage of the AC power source and an output voltage of the first node, sample an inductor current of the input inductor to obtain a current duty cycle in a current state within a first switching cycle and a valley current relative to a reference current, and execute an average current control algorithm to calculate an average current controlled next state duty cycle to generate an average current control signal; configuring a predictive valley-peak current control module to obtain the input voltage, the output voltage, and the current duty cycle, and execute a predictive valley-peak current control algorithm within the first switching cycle to calculate a predictive valley-peak current controlled next state duty cycle to generate a predictive valley-peak current control signal; configuring a pulse width modulator module to receive the average current control signal and the predictive valley-peak current control signal and generate a first average current controlled PWM signal, a first predictive valley-peak current controlled PWM signal, a second average current controlled PWM control signals and a second predictive valley-peak current controlled PWM signal; configuring a first OR gate to receive the first average current controlled PWM signal and the first predictive valley-peak current controlled PWM signal, and perform an OR operation to generate a first switch control signal for controlling the first switch within a second switching cycle; configuring a second OR gate to receive the second average current controlled PWM signal and the second predictive valley-peak current controlled PWM signal, and perform an OR operation to generate a second switch control signal for controlling the second switch within the second switching cycle; and configuring the pulse width modulator module to generate, based on the average current control signal and the predictive valley-peak current control signal, a third switch control signal and a fourth switch control signal for controlling the third switch and the fourth switch within the second switching cycle, respectively. The switching cycle of the first switch control signal and the second switch control signal is smaller than or equal to 0.5 times the first switching cycle.

In some embodiments, switching frequencies of the third switch control signal and the fourth switch control signal are equal to a voltage frequency of the AC power source.

In some embodiments, the first switch and the second switch are gallium nitride high-speed electron mobility field effect transistors, and the third switch and the fourth switch are metal oxide semiconductor field effect transistors.

In some embodiments, the first through the fourth switches alternatively operate in a positive half cycle mode and a negative half cycle mode with a voltage frequency of the AC power source.

In some embodiments, the power factor correction method further includes: configuring a soft-start control module of the digital signal processor to, in response to the first through the fourth switches entering the positive half-cycle mode from the negative half-cycle mode or entering the negative half-cycle mode from the positive half-cycle mode, gradually increase a duty cycle of the second switch or the first switch to reach a duty cycle indicated by the second switch signal or the first switch signal.

In some embodiments, the power factor correction method further includes: configuring a voltage loop compensator of to generate the reference current according to a difference between the output voltage and a reference voltage; configuring an adder of the average current control module to receive the reference current and the inductor current to generate a difference signal for indicating a difference between the reference current and the inductor current; configuring a continuous conduction mode (CCM) calculation unit and a discontinuous conduction mode (DCM) calculation unit of a duty cycle feedforward control circuit of the average current control module to respectively calculate a continuous conduction mode (CCM) duty cycle feedforward amount and a discontinuous conduction mode (DCM) duty cycle feedforward amount according to the input voltage, the output voltage, and an ideal input parameter; configuring the duty cycle feedforward control circuit is configured to use the smallest one of the CCM duty cycle feedforward amount and the DCM duty cycle feedforward amount as a duty cycle feedforward amount and correspondingly output a duty cycle feedforward signal; and configuring a current loop compensator to receive the difference signal and the duty cycle feedforward signal, and execute the predictive valley-peak current control algorithm to calculate the valley-peak current predictive controlled next state duty cycle to generate the predictive valley-peak current control signal.

Therefore, the totem-pole bridgeless power factor corrector and the power factor correction method provided by the present disclosure use the predictive valley-peak current control method to obtain the next state duty cycle, and use an OR gate combining a PWM signal of the average current control method and the predictive valley-peak current control method, thereby enabling the digital signal processor to update the duty cycle without triggering an interruption, reducing error between the valley-peak current and the current reference value, thereby improving the current distortion and making the circuit have better input current tracking.

For digital control, the totem-pole bridgeless power factor corrector and power factor correction method provided by the present disclosure utilize a duty cycle feedforward control method to address issues of current distortion resulting from different current transfer functions of CCM and DCM.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
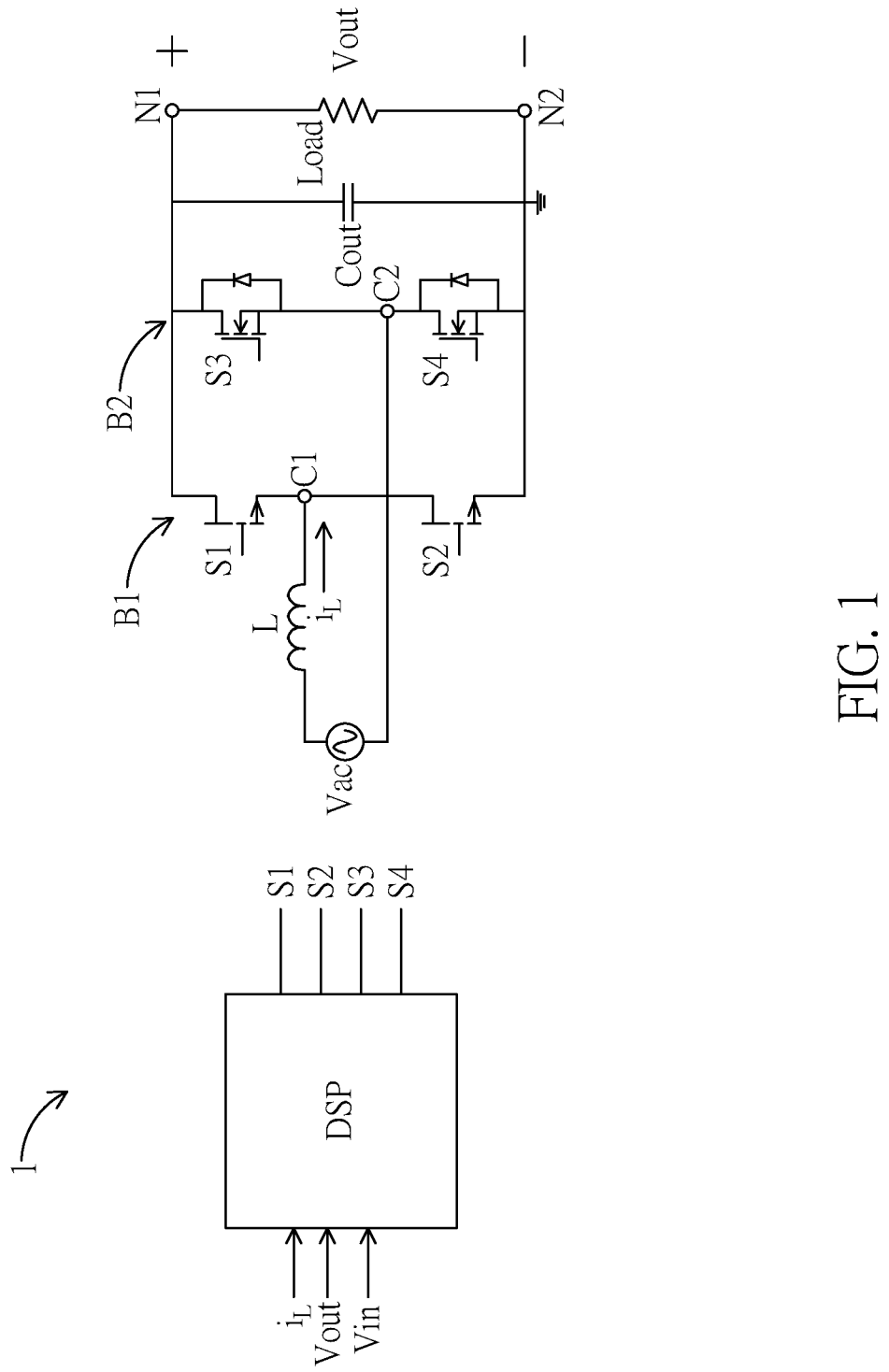
FIG. 1 is a circuit architecture diagram of a totem-pole bridgeless power factor corrector according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit architecture diagram of a totem-pole bridgeless power factor corrector according to an embodiment of the present disclosure. As shown in FIG. 1, an embodiment of the present disclosure provides a totem-pole bridgeless power factor corrector 1, which is connected to an input inductor L that receives power from an AC power source Vac. The totem-pole bridgeless power factor corrector 1 has a connection end C1 connected to the input inductor L and a second connection terminal C2, and includes a first bridge B1, a second bridge B2, a capacitor Cout, a load, and a digital signal processor DSP.

The first bridge arm B1 is connected between the first node N1 and the second node N2, and includes a first switch S1 and a second switch S2 connected in series with the first switch S1. The first bridge B1 is connected to the input inductor L through a connection point through which the first switch S1 is connected in series with the second switch S2.

The second bridge B1 is connected between the first node N1 and the second node N2, and is connected in parallel with the first bridge B1. The second bridge B1 includes a third switch S3 and a fourth switch S4 connected in series with the third switch S3. The second bridge B1 is connected to the second connection end C2 through a connection point through which the third switch S3 is connected in series with the fourth switch S4.

The capacitor Cout is connected between the first node N1 and the second node N2, and is connected in parallel with the first bridge B1 and the second bridge B2. The load is connected between the first node N1 and the second node N2, and is connected in parallel with the first bridge B1, the second bridge B2, and the capacitor Cout.

Traditional totem-pole bridgeless power factor correctors mostly use metal-oxide-semiconductor field-effect transistors (MOSFETs) as power switches. However, when the circuit operates in continuous conduction mode (CCM) while the power switches being turned on, serious switching loss occurs due to reverse recovery current of body diodes, causing that the traditional totem-pole bridgeless power factor corrector only suitable for discontinuous conduction mode (DCM) or critical conduction mode (CRM).

In order to solve the issues that the traditional totem-pole bridgeless power factor corrector is not suitable for operating in CCM, the present disclosure utilizes GaN High Electron Mobility Field Effect Transistor (GaN HEMT) suitable for operating in CCM and hard-switching conditions to replace the original MOSFETs, thereby reducing losses due to the reverse recovery current of the body diodes by using fast-switching characteristics while avoiding disadvantages of the body diodes. Since the GaN HEMT reduces the losses caused by the reverse recovery current of the body diode, only losses caused by parasitic capacitances on the power switches are left, which greatly reduces the switching losses compared to the MOSFETs, thereby enabling the traditional totem-pole bridgeless power factor corrector can operate in CCM.

In this case, the first bridge B1 is a fast-switching bridge, the first switch S1 and the second switch S2 thereof utilize HEMT having wide band gap to replace the MOSFET originally used, and use synchronous rectification switching control to reduce conduction loss caused by a current flowing through a inductor when the inductor releases energy. A switching frequency of the fast-switching bridge can be 200 kHz.

On the other hand, the second bridge B2 is a slow-speed switching bridge, and MOSFETs having lower turn-on resistance are selected for the third switch S3 and the fourth switch S4 to replace slow diodes originally used to achieve improved efficiency. Switching frequencies of the third switch S3 and the fourth switch S4 on the second bridge B2 are equal to a voltage frequency of the AC power source Vac.

Figure 2:
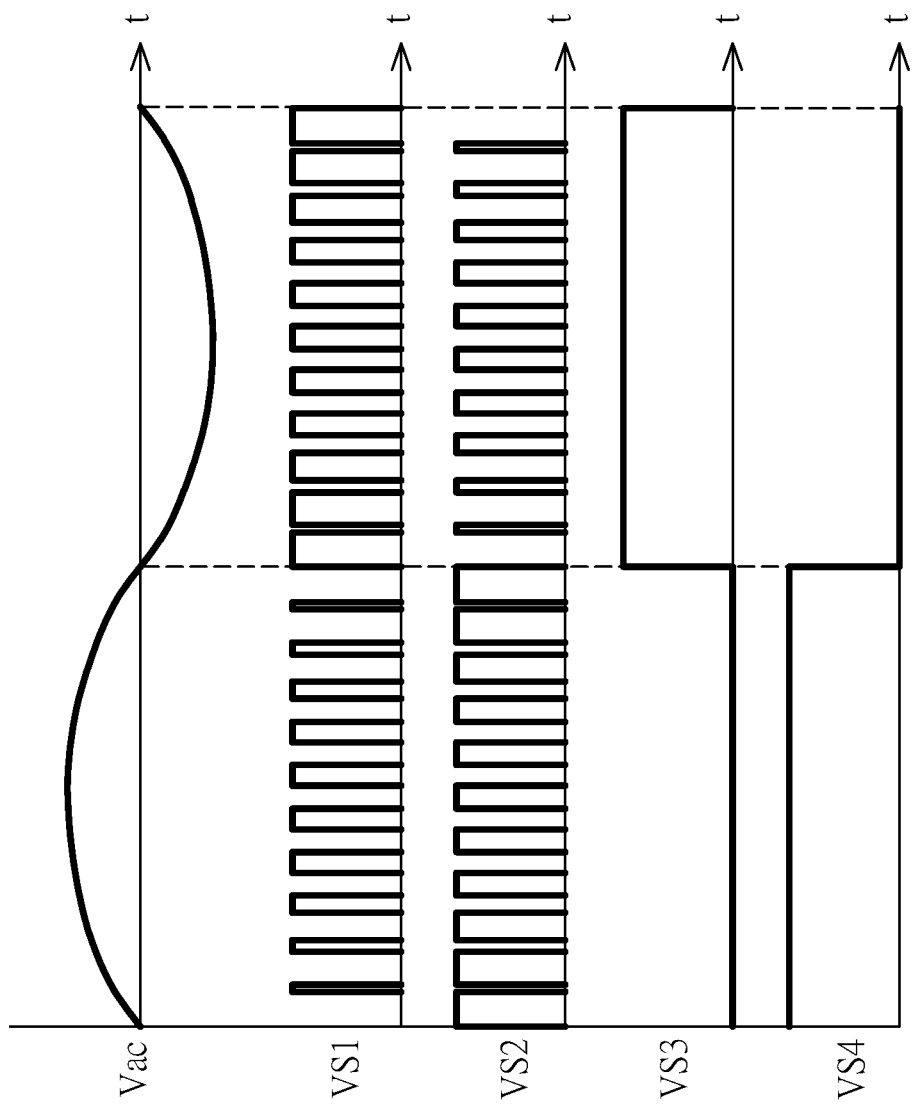
FIG. 2 is a timing diagram of switch signals of a totem-pole bridgeless architecture according to an embodiment of the present disclosure.

Reference is made to FIG. 2, which is a timing diagram of switch signals of a totem-pole bridgeless architecture according to an embodiment of the present disclosure. In FIG. 2, the vertical axis represents voltage, and the horizontal axis represents time t. The first switch S1 through the fourth switch S4 operate alternately in a positive half-cycle mode and a negative half-cycle mode with the voltage frequency of the AC power source Vac. Here, according to switching signals VS1, VS2, VS3, and VS4 of the first switch S1 to the fourth switch S4, it can be seen that current paths of the positive half-cycle are operated by the first switch S1, the second switch S2, and the fourth switch S4. The second switch S2 is a main power switch, the first switch S1 is a synchronous rectification switch, and current paths of the negative half-cycle are operated by the first switch S1, the second switch S2, and the third switch S3. The first switch S1 is the main power switch, and the second switch S2 is the synchronous rectification switch. Switching modes are shown in Table 1 below.

TABLE I

| | Positive half-cycle | | Negative half-cycle | |
| --- | --- | --- | --- | --- |
| Element | State I | State II | State III | State IV |
| S1 | OFF | ON | S1 | OFF |
| S2 | ON | OFF | S2 | ON |
| S3 | OFF | OFF | S3 | OFF |
| S4 | ON | ON | S4 | ON |

In state I, the second switch S2 and the fourth switch S4 are turned on, and the first switch S1 and the third switch S3 are turned off. At this time, the input voltage stores energy in the input inductance L while the capacitor Cout discharges the load.

In state II, the first switch S1 and the fourth switch S4 are turned on, and the second switch S2 and the third switch S3 are turned off. At this time, the input inductance L releases energy.

In state III, the first switch S1 and the third switch S3 are turned on, and the second switch S2 and the fourth switch S4 are turned off. At this time, the input voltage stores energy in the input inductance L while the capacitor Cout discharges the load.

In state IV, the second switch S2 and the third switch S3 are turned on, and the first switch S1 and the fourth switch S4 are turned off. At this time, the input inductance L releases energy.

Figure 3:
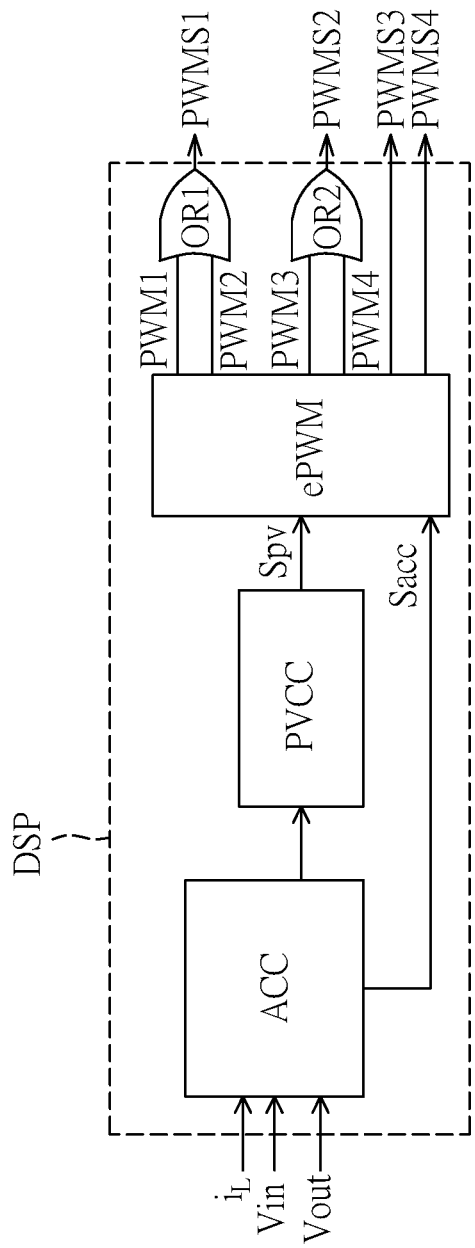
FIG. 3 is a block diagram of a digital signal processor according to an embodiment of the present disclosure.

Architecture of the digital signal processor of the present disclosure will be described below. Reference is further made to FIG. 3, which is a block diagram of a digital signal processor according to an embodiment of the present disclosure. As shown in FIG. 3, the digital signal processor DSP includes an average current control module ACC, a predictive valley-peak current control module PVCC, a pulse width modulator module ePWM, a first OR gate OR1 and a second OR gate OR2.

As shown in FIG. 3, the average current control module ACC is configured to detect an input voltage Vin of the AC power source Vac and an output voltage Vout of the first node N1, sample an inductor current $i_L$ of the input inductor L to obtain a current duty cycle $d_c[n]T_s$ in a current state within a first switching cycle and a valley-peak current $i_{L\_n}$ relative to a reference current iref, and execute an average current control algorithm to calculate an average current controlled next state duty cycle $d_c[n+1]T_s$ to generate an average current control signal Sacc.

On the other hand, the predictive valley-peak current control module PVCC is connected to the average current control module ACC, and is configured to obtain the input voltage Vin, the output voltage Vout, and the current duty cycle $d_p[n]T_s$, and execute a predictive valley-peak current control algorithm within the first switching cycle T1 to calculate a predictive valley-peak current controlled next state duty cycle $d_p[n+1]T_s$ to generate the valley-peak current predictive control signal Spv.

Figure 4:
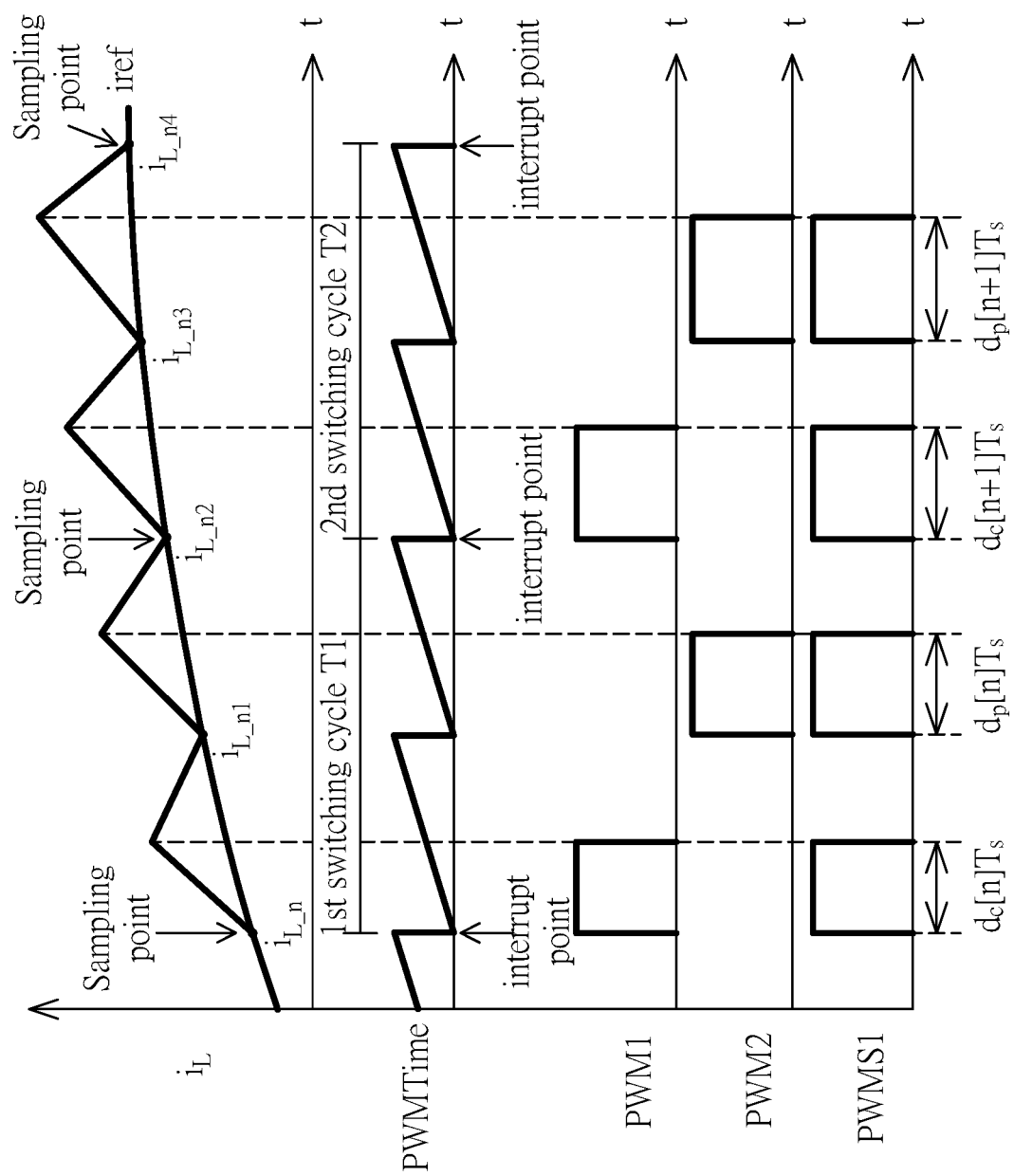
FIG. 4 is a control timing diagram of an average current control combined with a predictive valley-peak current control according to an embodiment of the present disclosure.

Reference is further made to FIG. 4, which is a control timing diagram of an average current control combined with a predictive valley-peak current control according to an embodiment of the present disclosure. In order to address issues pertaining to the digital signal processor having insufficient executable program time at high frequencies and the duty cycle being unable to be updated, the present disclosure configures the digital signal processor DSP to generate PWM signals of an average current control method and a predictive valley-peak current control method within one switching cycle, respectively, and the two PWM signals are turned into one switching signal having double-frequency through OR gate elements.

As shown in FIG. 3, the present disclosure utilizes the average current control method followed by the predictive valley-peak current control method, $d_c[n]T_s$ and $d_c[n+1]T_s$ are duty cycles of the current state and the next state, the control method is the average current control method, and a current sampling point is a valley-peak current. $d_p[n]T_s$ and $d_p[n+1]T_s$ are also the duty cycles of the current state and the next state. The control method is the predictive valley-peak control method, and a positive slope and a negative slope of the inductor current thereof are as shown as following equations (1) and (2):

$$\Delta i^+ = \frac{V_{in}DT_s}{L}; \qquad \text{eq (1)}$$

$$\Delta i^- = \frac{(V_{in} - V_{out})(1-D)T_s}{L}; \qquad \text{eq (2)}$$

Therefore, valley-peak currents $i_{L\_n1}$, $i_{L\_n2}$, $i_{L\_n3}$, and $i_{L\_n4}$ can be obtained according to equations (1) and (2), as shown in the following equations (3), (4), (5), and (6):

$$i_{L\_n1} = i_{L\_n} + \frac{V_{in}T_s}{L} - \frac{V_{out}(1 - d_c[n])T_s}{L}; \qquad \text{eq (3)}$$

$$i_{L\_n2} = i_{L\_n1} + \frac{V_{in}T_s}{L} - \frac{V_{out}(1 - d_p[n])T_s}{L}; \qquad \text{eq (4)}$$

$$i_{L\_n3} = i_{L\_n2} + \frac{V_{in}T_s}{L} - \frac{V_{out}(1 - d_c[n+1])T_s}{L}; \quad \text{eq (5)}$$

$$i_{L\_n4} = i_{L\_n3} + \frac{V_{in}T_s}{L} - \frac{V_{out}(1 - d_p[n+1])T_s}{L}; \quad \text{eq (6)}$$

The pulse width modulator module ePWM of the digital signal processor DSP will enable an interrupted trigger state based on a timer reference signal of a counter (built in the digital signal processor DSP) when entering from the first switching period T1 to the second switching period T2, then convert the duty cycle calculated in the current state into a switching signal, instead of updating the current state $d_p[n]$ $T_s$ before it starts. Therefore, in the first switching cycle T1, the switching signal of the current state is not equal to the duty cycle calculated in the current state. Therefore, in order to obtain the correct current switching signal, it is necessary to calculate the duty cycle of the next state in the current state to avoid errors from occurring in the switching signal due to the delay.

Further, the next state duty cycle dc[n+1] of the average current control method can be obtained by substituting the valley current $i_{L\_n2}$, and the next state duty cycle dp[n+1] of the predictive valley-peak control method can be calculated according to equation (6), as shown in the following equation (7):

$$d_p[n+1] = \frac{L(i_{ref} - i_L[n+3])}{T_s V_{out}} + \frac{V_{out} - V_{in}}{V_{out}}; \quad \text{eq (7)}$$

Therefore, after the next state duty cycle is obtained by the predictive valley-peak current control method, the pulse width modulator module ePWM can receive the average current control signal Sacc and the predictive valley-peak current control signal Spv, and is configured to generate a first average current controlled PWM signal PWM1, a first predictive valley-peak current controlled PWM signal PWM2, a second average current controlled PWM control signal PWM3 and a second predictive valley-peak current controlled PWM signal PWM4.

The first OR gate OR1 is configured to receive the first average current controlled PWM signal PWM1 and the first predictive valley-peak current controlled PWM signal PWM2, and perform an OR operation to generate a first switch control signal PWMS1 for controlling the first switch S1 within a second switching cycle T2. The second OR gate OR1 is configured to receive the second average current controlled PWM signal PWM3 and the second predictive valley-peak current controlled PWM signal PWM4, and perform an OR operation to generate a second switch control signal PWMS2 for controlling the second switch S2 within the second switching cycle T2.

The pulse width modulator module ePWM is further configured to generate a third switch control signal PWMS3 and a fourth switch control signal PWMS4 based on the average current control signal Sac and the predictive valley-peak current control signal Spy for controlling the third switch S3 and the fourth switch S4 within the second switching cycle T2, respectively. In other words, the fast-switching bridge, such as the first bridge B1, will make corresponding actions according to the positive and negative half cycles and different counting intervals of the counter (built in the digital signal processor DSP), and the slow-switching bridge, such as the second bridge B2, sends corresponding switching signals according to determination of the positive and negative half cycles.

Therefore, PWM signals having lower frequency generated by the digital signal processor DSP can then make the switching frequency of the circuit be more than twice the frequency of the PWM signal, thereby addressing issues that the duty cycle cannot be updated in every state resulting from lack of executable program time of the digital signal processor at high frequencies, so as to improve power factor and total harmonic current distortion. In some embodiments, switching cycles of the first switch control signal and the second switch control signal are smaller than or equal to 0.5 times the first switching cycle T1.

Next, although the totem-pole bridgeless architecture uses the MOSFETs having lower turn-on resistance to replace the slow diodes originally used to improve efficiency, this also results in issues occurring when the circuit is alternatively switched between positive and negative half cycles of the AC power supply. If the original switch mode is continued to be used under unfavorable operating conditions, the circuit will be damaged.

When the switching mode of the circuit is changed from the negative half cycle to the positive half cycle, the duty cycle of the first switch S1 is changed from almost 100% to 0%, and the duty cycle of the second switch S2 is changed from 0% to 100%. Due to the reverse recovery currents of the MOSFETs, the third switch S3 cannot be turned off instantaneously, and since the fourth switch S4 has a large parasitic capacitance, a drain-source voltage of the fourth switch S4 is still equal to the output voltage Vout. If the second switch S2 is turned on at this time, the voltage of the input inductor L is equal to the output high voltage, and a current surge will flow through the second switch S2, causing damage of the second switch S2.

Therefore, in order to solve issues relating to zero-crossing current surge, the present disclosure also utilizes a soft-start method to gradually increase the duty cycle of the switches, instead of instantaneously changing from 0% to 100%, thereby reducing the occurrence of current surge due to instantaneous turning on of the switches.

Figure 5:
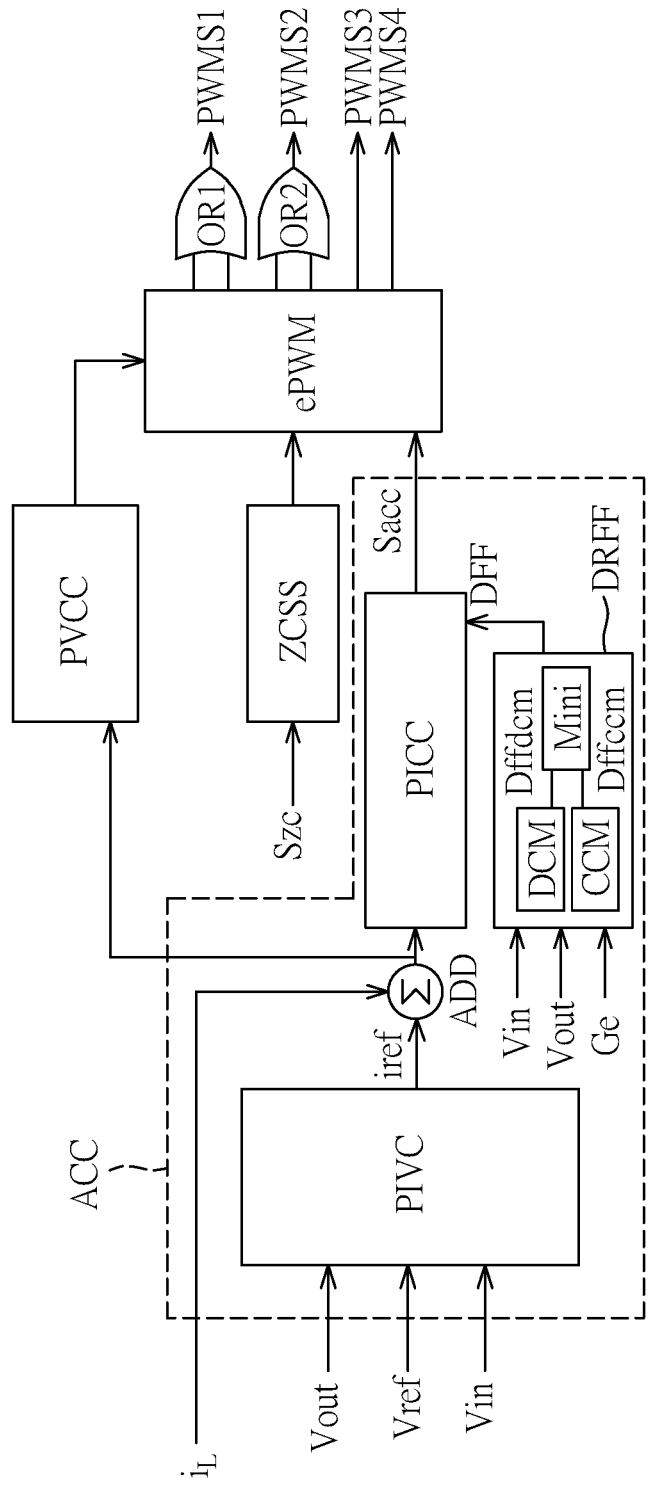
FIG. 5 is a structural diagram of a digital signal processor according to an embodiment of the present disclosure.

Reference is further made to FIG. 5, which is a structural diagram of a digital signal processor according to an embodiment of the present disclosure. As shown in FIG. 5, the digital signal processor DSP further includes a soft-start control module ZCSS that is connected to the pulse width modulator module ePWM, and controlled by a soft-start command Szc to, in response to the first switch S1 entering the positive half-cycle mode from the negative half-cycle mode, control the pulse width modulator module ePWM to gradually increase the duty cycle of the first switch S1 to reach a duty cycle indicated by the first switch signal PWMS1. Alternatively, in response to the second switch S2 entering the negative half-cycle mode from the positive half-cycle mode, the pulse width modulator module ePWM is controlled to gradually increase the duty cycle of the second switch S2 to reach the duty cycle indicated by the second switch signal PWMS2.

In some embodiments, the average current control module ACC further includes a voltage loop compensator PIVC, an adder ADD, a duty cycle feedforward control circuit DRFF, and a current loop compensator PICC.

The voltage loop compensator PIVC is configured to generate a reference current iref according to a difference between the output voltage Vout and a reference voltage Vref. The adder ADD receives the reference current iref and the inductor current $i_L$ to generate a difference signal for indicating a difference between the reference current iref and the inductor current $i_L$.

In order to address issues that a current gain is insufficient in the DCM, the present disclosure also utilizes a duty cycle feedforward control method to calculate an ideal duty cycle feedforward amount and add it to the output of the current compensator. Since the feedforward amount of the duty cycle already contains sufficient current gain, the current compensator only needs to provide the remaining insufficient current gain. Therefore, demands for bandwidth and gain of the current compensator is reduced, and the current compensator can obtain better input current tracking more easily to achieve the purpose of improving current distortion.

In detail, the duty cycle feedforward control circuit DRFF includes a continuous conduction mode calculation unit CCM and a discontinuous conduction mode calculation unit DCM, which are configured to calculate a continuous conduction mode duty cycle feedforward amount Dffccm and discontinuous conduction mode duty cycle feedforward amount Dffdcm based on the input voltage Vin, the output voltage Vout, and the ideal input parameter Ge, respectively. The duty cycle feedforward control circuit DRFF is provided with a minimized module Mini, which is configured to use the smallest one of the continuous conduction mode duty cycle feedforward amount Dffccm and the discontinuous conduction mode duty cycle feedforward amounts Dffdcm as a duty cycle feedforward amount DFF, and correspondingly output a duty cycle feedforward signal.

In this case, the continuous conduction mode duty cycle feedforward amount Dffccm can be obtained from a relationship of an ideal switching voltage: Dffccm=1-Vin/Vout, and the discontinuous conduction mode duty cycle feedforward amount Dffdcm can be obtained from a relationship of an ideal input inductor current: iL(t)=GeVin(t). In order for the totem-pole bridgeless power factor modifier 1 to obtain duty cycle feedforward amount to the corresponding conduction modes operated under different loads, the continuous conduction mode duty cycle feedforward amount Dffccm and the discontinuous conduction mode duty cycle feedforward amount Dffdcm can be compared to take the minimum value to get a correct duty cycle feedforward amount DFF, thereby improving current compensation for operations of CCM and DCM, to achieve better current tracking and improved current distortion.

The current loop compensator PICC receives the difference signal and the duty cycle feedforward signal to execute the predictive valley-peak current control algorithm described above to calculate the predictive valley-peak current controlled next state duty cycle $d_c[n+1]T_s$ to generate the predictive valley-peak current control signal Sacc.

Therefore, the totem-pole bridgeless power factor corrector and the power factor correction method provided by the present disclosure use the predictive valley-peak current control method to obtain the next state duty cycle, and use an OR gate combining a PWM signal of the average current control method and the predictive valley-peak current control method, thereby enabling the digital signal processor to update the duty cycle without triggering an interruption, reducing error between the valley-peak current and the current reference value, thereby improving the current distortion and making the circuit have better input current tracking.

For digital control, the totem-pole bridgeless power factor corrector and power factor correction method provided by the present disclosure utilize a duty cycle feedforward control method to address issues of current distortion resulting from different current transfer functions of CCM and DCM.

Figure 6:
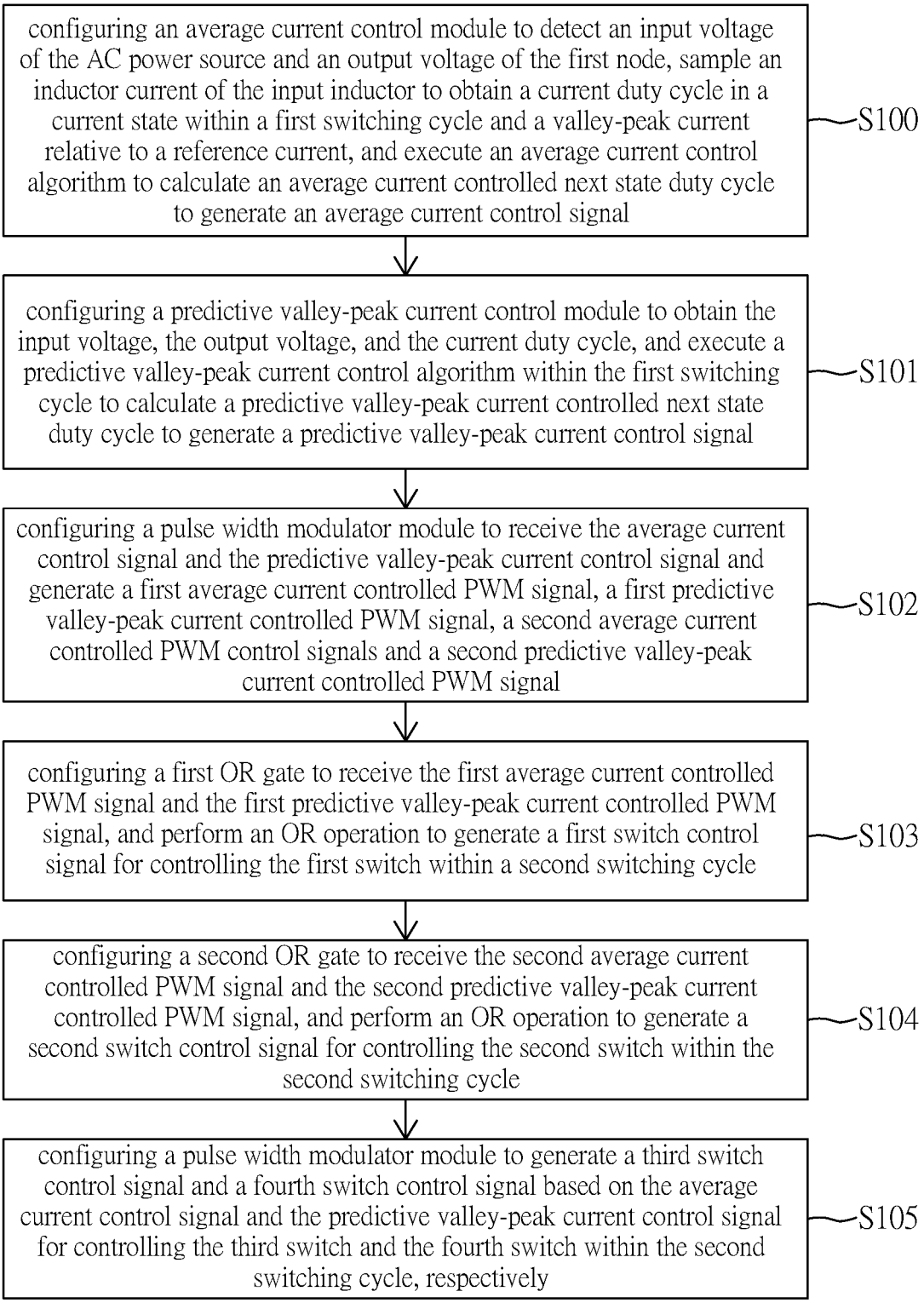
FIG. 6 is a flowchart of a power factor correction method according to an embodiment of the present disclosure.

In addition, the present disclosure further provides a power factor correction method, which is applicable to the totem-pole bridgeless power factor corrector of the above embodiment. Reference is made to FIG. 6, which is a flowchart of a power factor correction method according to an embodiment of the present invention, which includes the following steps:

Step S100: configuring an average current control module to detect an input voltage of the AC power source and an output voltage of the first node, sample an inductor current of the input inductor to obtain a current duty cycle in a current state within a first switching cycle and a valley-peak current relative to a reference current, and execute an average current control algorithm to calculate an average current controlled next state duty cycle to generate an average current control signal.

Step S101: configuring a predictive valley-peak current control module to obtain the input voltage, the output voltage, and the current duty cycle, and execute a predictive valley-peak current control algorithm within the first switching cycle to calculate a predictive valley-peak current controlled next state duty cycle to generate a predictive valley-peak current control signal.

Step S102: configuring a pulse width modulator module to receive the average current control signal and the predictive valley-peak current control signal and generate a first average current controlled PWM signal, a first predictive valley-peak current controlled PWM signal, a second average current controlled PWM control signals and a second predictive valley-peak current controlled PWM signal.

Step S103: configuring a first OR gate to receive the first average current controlled PWM signal and the first predictive valley-peak current controlled PWM signal, and perform an OR operation to generate a first switch control signal for controlling the first switch within a second switching cycle.

Step S104: configuring a second OR gate to receive the second average current controlled PWM signal and the second predictive valley-peak current controlled PWM signal, and perform an OR operation to generate a second switch control signal for controlling the second switch within the second switching cycle.

Step S105: configuring a pulse width modulator module to generate a third switch control signal and a fourth switch control signal based on the average current control signal and the predictive valley-peak current control signal for controlling the third switch and the fourth switch within the second switching cycle, respectively.

It should be noted that the operation details of the average current control module, the predictive valleypeak current control module, the pulse width modulator module, the duty cycle feedforward control circuit, and the slow-start control module have been described in the foregoing embodiments, and the repeated descriptions are omitted hereinafter.

In conclusion, the totem-pole bridgeless power factor corrector and the power factor correction method provided by the present disclosure use the predictive valley-peak current control method to obtain the next state duty cycle, and use an OR gate combining a PWM signal of the average current control method and the predictive valley-peak current control method, thereby enabling the digital signal processor to update the duty cycle without triggering an interruption, reducing error between the valley-peak current and the current reference value, thereby improving the current distortion and making the circuit have better input current tracking.

For digital control, the totem-pole bridgeless power factor corrector and power factor correction method provided by the present disclosure utilize a duty cycle feedforward control method to address issues of current distortion resulting from different current transfer functions of CCM and DCM.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A totem-pole bridgeless power factor corrector, connected to an input inductor that receives power from an AC power source having a first connection end connected to the input inductor and a second connection end, the totem pole bridgeless power factor corrector comprising:
   a first bridge connected between a first node and a second node and including a first switch and a second switch connected in series with the first switch, wherein the first bridge is connected to the input inductor through a connection point through which the first switch is connected in series with the second switch;
   a second bridge connected between the first node and the second node, connected in parallel to the first bridge, and including a third switch and a fourth switch connected in series with the third switch, wherein the second bridge is connected to the second connection end through a connection point through which the third switch is connected in series with the fourth switch;
   a capacitor connected between the first node and the second node and connected in parallel with the first bridge and the second bridge;
   a load connected between the first node and the second node, and connected in parallel with the first bridge, the second bridge, and the capacitor;
   a digital signal processor, including:
      an average current control module configured to detect an input voltage of the AC power source and an output voltage of the first node, and sample an inductor current of the input inductor to obtain a current duty cycle in a current state within a first switching cycle and a valley-peak current relative to a reference current, and execute an average current control algorithm to calculate an average current controlled next state duty cycle to generate an average current control signal;
      a predictive valley-peak current control module connected to the average current control module and configured to obtain the input voltage, the output voltage, and the current duty cycle, and execute a predictive valley-peak current control algorithm within the first switching cycle to calculate a predictive valley-peak current controlled next-state duty cycle to generate a predictive valley-peak current control signal;
      a pulse width modulator module receiving the average current control signal and the predictive valley-peak current control signal and configured to generate a first average current controlled PWM signal, a first predictive valley-peak current controlled PWM signal, a second average current controlled PWM control signals and a second predictive valley-peak current controlled PWM signal;
      a first OR gate configured to receive the first average current controlled PWM signal and the first predictive valley-peak current controlled PWM signal, and perform an OR operation to generate a first switch control signal for controlling the first switch within a second switching cycle; and
      a second OR gate configured to receive the second average current controlled PWM signal and the second predictive valley-peak current controlled PWM signal, and perform an OR operation to generate a second switch control signal for controlling the second switch within the second switching cycle; and
   wherein the pulse width modulator module is further configured to generate a third switch control signal and a fourth switch control signal based on the average current control signal and the predictive valley-peak current control signal for controlling the third switch and the fourth switch within the second switching cycle, respectively, and switching cycles of the first switch control signal and the second switch control signal are smaller than or equal to 0.5 times the first switching cycle.

2. The totem-pole bridgeless power factor corrector according to claim 1, wherein switching frequencies of the third switch control signal and the fourth switch control signal are equal to a voltage frequency of the AC power source.

3. The totem-pole bridgeless power factor corrector according to claim 1, wherein the first switch and the second switch are gallium nitride high-speed electron mobility field effect transistors, and the third switch and the fourth switch are metal oxide semiconductor field effect transistors.

4. The totem-pole bridgeless power factor corrector according to claim 1, wherein the first through the fourth switches alternatively operate in a positive half cycle mode and a negative half cycle mode with a voltage frequency of the AC power source.

5. The totem-pole bridgeless power factor corrector according to claim 4, wherein the digital signal processor further includes a soft-start control module that is connected to the pulse width modulator module, and that is configured to, in response to the first through the fourth switches entering the positive half-cycle mode from the negative half-cycle mode or entering the negative half-cycle mode from the positive half-cycle mode, gradually increase a duty cycle of the second switch or the first switch to reach a duty cycle indicated by the second switch signal or the first switch signal.

6. The totem-pole bridgeless power factor corrector according to claim 1, wherein the average current control module further includes:
   a voltage loop compensator configured to generate the reference current according to a difference between the output voltage and a reference voltage;

an adder configured to receive the reference current and the inductor current to generate a difference signal for indicating a difference between the reference current and the inductor current;
a duty cycle feedforward control circuit, including a continuous conduction mode (CCM) calculation unit and a discontinuous conduction mode (DCM) calculation unit respectively configured to calculate a continuous conduction mode (CCM) duty cycle feedforward amount and a discontinuous conduction mode duty cycle feedforward amount according to the input voltage, the output voltage, and an ideal input parameter, wherein the duty cycle feedforward control circuit is configured to use the smallest one of the CCM duty cycle feedforward amount and the DCM duty cycle feedforward amount as a duty cycle feedforward amount and correspondingly output a duty cycle feedforward signal; and
a current loop compensator configured to receive the difference signal and the duty cycle feedforward signal to execute the predictive valley-peak current control algorithm to calculate the valley-peak current predictive controlled next state duty cycle to generate the predictive valley-peak current control signal.

7. A power factor correction method applicable to a totem-pole bridgeless power factor corrector connected to an input inductor that receives power from an AC power source having a first connection end connected to the input inductor and a second connection end, the power factor correction method comprising:
configuring an average current control module to detect an input voltage of the AC power source and an output voltage of the first node, sample an inductor current of the input inductor to obtain a current duty cycle in a current state within a first switching cycle and a valley-peak current relative to a reference current, and execute an average current control algorithm to calculate an average current controlled next state duty cycle to generate an average current control signal;
configuring a predictive valley-peak current control module to obtain the input voltage, the output voltage, and the current duty cycle, and execute a predictive valley-peak current control algorithm within the first switching cycle to calculate a predictive valley-peak current controlled next state duty cycle to generate a predictive valley-peak current control signal;
configuring a pulse width modulator module to receive the average current control signal and the predictive valley-peak current control signal and generate a first average current controlled PWM signal, a first predictive valley-peak current controlled PWM signal, a second average current controlled PWM control signals and a second predictive valley-peak current controlled PWM signal;
configuring a first OR gate to receive the first average current controlled PWM signal and the first predictive valley-peak current controlled PWM signal, and perform an OR operation to generate a first switch control signal for controlling the first switch within a second switching cycle;
configuring a second OR gate to receive the second average current controlled PWM signal and the second predictive valley-peak current controlled PWM signal, and perform an OR operation to generate a second switch control signal for controlling the second switch within the second switching cycle; and configuring the pulse width modulator module to generate, based on the average current control signal and the predictive valley-peak current control signal, a third switch control signal and a fourth switch control signal for controlling the third switch and the fourth switch within the second switching cycle, respectively, wherein switching cycles of the first switch control signal and the second switch control signal are smaller than or equal to 0.5 times the first switching cycle.

8. The power factor correction method according to claim 7, wherein switching frequencies of the third switch control signal and the fourth switch control signal are equal to a voltage frequency of the AC power source.

9. The power factor correction method according to claim 7, wherein the first switch and the second switch are gallium nitride high-speed electron mobility field effect transistors, and the third switch and the fourth switch are metal oxide semiconductor field effect transistors.

10. The power factor correction method according to claim 7, wherein the first through the fourth switches alternatively operate in a positive half cycle mode and a negative half cycle mode with a voltage frequency of the AC power source.

11. The power factor correction method according to claim 10, further comprising:
configuring a soft-start control module of the digital signal processor to, in response to the first through the fourth switches entering the positive half-cycle mode from the negative half-cycle mode or entering the negative half-cycle mode from the positive half-cycle mode, gradually increase a duty cycle of the second switch or the first switch to reach a duty cycle indicated by the second switch signal or the first switch signal.

12. The power factor correction method according to claim 7, further comprising:
configuring a voltage loop compensator of to generate the reference current according to a difference between the output voltage and a reference voltage;
configuring an adder of the average current control module to receive the reference current and the inductor current to generate a difference signal for indicating a difference between the reference current and the inductor current;
configuring a continuous conduction mode (CCM) calculation unit and a discontinuous conduction mode (DCM) calculation unit of a duty cycle feedforward control circuit of the average current control module to respectively calculate a continuous conduction mode (CCM) duty cycle feedforward amount and a discontinuous conduction mode (DCM) duty cycle feedforward amount according to the input voltage, the output voltage, and an ideal input parameter;
configuring the duty cycle feedforward control circuit is configured to use the smallest one of the CCM duty cycle feedforward amount and the DCM duty cycle feedforward amount as a duty cycle feedforward amount and correspondingly output a duty cycle feedforward signal; and
configuring a current loop compensator to receive the difference signal and the duty cycle feedforward signal, and execute the predictive valley-peak current control algorithm to calculate the valley-peak current predictive controlled next state duty cycle to generate the predictive valley-peak current control signal.

* * * * *